(12) United States Patent
Mattison

(10) Patent No.: US 6,888,121 B2
(45) Date of Patent: May 3, 2005

(54) PROCESSING OF IMAGING DATA USING DIFFERENCES BETWEEN ANALOG PHOTOCELL DATA ELEMENTS

(75) Inventor: Phillip E. Mattison, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 96 days.

(21) Appl. No.: 09/995,279

(22) Filed: Nov. 26, 2001

(65) Prior Publication Data

US 2002/0033444 A1 Mar. 21, 2002

Related U.S. Application Data

(62) Division of application No. 09/307,574, filed on May 7, 1999.

(51) Int. Cl.[7] .............................................. H01L 27/00
(52) U.S. Cl. ................................ 250/208.1; 250/214 A
(58) Field of Search ........................... 250/208.1, 208.2, 250/214 A, 214 R; 348/302, 316–324

(56) References Cited

U.S. PATENT DOCUMENTS

| | | | |
|---|---|---|---|
| 3,833,903 A | 9/1974 | Gordon et al. | |
| 4,724,311 A | 2/1988 | Mechlenburg | |
| 4,839,729 A | * 6/1989 | Ando et al. | 348/241 |
| 4,864,515 A | 9/1989 | Deck | |
| 5,461,425 A | 10/1995 | Fowler et al. | |
| 5,479,208 A | 12/1995 | Okumura | |
| 5,764,288 A | 6/1998 | Gorelik | |
| 5,795,300 A | 8/1998 | Bryars | |
| 5,929,905 A | 7/1999 | Kanda et al. | |
| 5,962,844 A | 10/1999 | Merrill et al. | |
| 6,339,748 B1 | 1/2002 | Hiramatsu | |
| 6,354,733 B2 | 3/2002 | Glasheen et al. | |
| 6,476,864 B1 | 11/2002 | Borg et al. | |
| 6,529,237 B1 | 3/2003 | Tsay et al. | |

FOREIGN PATENT DOCUMENTS

| | | | |
|---|---|---|---|
| RU | 740085 | * | 7/1994 |
| WO | WO 00/69166 | | 11/2000 |

OTHER PUBLICATIONS

European Patent Office Search Report, PCT/US, 00/11/11963. Mailing Date: Jan. 15, 2001, 8 pages.

Dickinson, et al., "A 256=256 CMOS Active Pixel Image Sensor with Motion Detection", IEE International Solid-State Circuits Conference, pp. 226–227, (Feb. 1995).

* cited by examiner

Primary Examiner—Thanh X. Luu
(74) Attorney, Agent, or Firm—Blakely, Sokoloff, Taylor & Zafman LLP

(57) ABSTRACT

Under an embodiment, a system includes an array of analog photocells; a first plurality of shift cells, each shift cell in the first plurality of shift cells being coupled to a corresponding analog photocell; and a second plurality of shift cells, each shift cell in the second plurality of shift cells being coupled to a corresponding shift cell in the first plurality of shift cells; and a differential operational amplifier having a first input coupled to a terminating output of the first plurality of shift cells and a second input coupled to a terminating output of the second plurality of shift cells.

8 Claims, 4 Drawing Sheets

US 6,888,121 B2

PROCESSING OF IMAGING DATA USING DIFFERENCES BETWEEN ANALOG PHOTOCELL DATA ELEMENTS

CROSS-REFERENCE TO RELATED APPLICATIONS

This application is a divisional of U.S. patent application Ser. No. 09/307,574, filed May 7, 1999 and assigned to the assignee of the present application.

BACKGROUND OF THE INVENTION

1. Field of the Invention

The invention relates generally to the field of image processing. More specifically, the invention relates to image or motion video compression.

2. Description of the Related Art

In the current state of the art, image capture devices, those devices which represent an environment or scene by electrical signals that are proportional to the color and/or intensity of light present in the scene, are often manufactured and designed using CCD (Charge Coupled Device) technology. A CCD image capture device utilizes small photocells to generate electrical signals that are related to the incident light from the scene that strikes the photocells. The imaging device contains a two-dimensional array of such photocells such that a series of signals across an entire focused upon scene can be captured and stored. More recently, CMOS (Complementary Metal Oxide Semiconductor) imager devices have been developed which function to provide the same sort of output signals that CCD devices to but often at a lower cost and complexity. Examples of common imaging devices include scanners, motion video cameras and digital still cameras.

Many of these imaging devices, whether based on CMOS or CCD technology, are designed to be compliant with a transmission standard known as NTSC (National Television Systems Committee). One stricture of NTSC is that an image should be transmitted not in successive scan rows (of the imager array), but with odd rows transmitted separately from the even rows. This process of separating odd and even rows is commonly referred to as an interlaced scan. An NTSC signal has light intensity information encoded as analog voltage levels, color information encoded in the phase and amplitude of a color carrier frequency and so on. When an NTSC signal is forwarded for image processing to a computer system, the computer system utilizes a signal converter to transform the analog encoded information into luminance and chrominance digital values for the transmitted image. The most commonly used luminance-chrominance format for the digital representation of images is known as YCrCb (a digital color system referred to as the CCIR (International Consultative Committee on Broadcasting) 601 color space). The conversion from NTSC to YCrCb is serial in nature and due to the serial processing character of most commercially available microprocessors. Subsequent image processing is also performed in serial. One notable exception to the predominance of serial data processing is Intel's MMX™ technology based processors which use SIMD (Single Instruction Multiple Data) processing. To complement the use of such processors in conjunction with imaging devices, it would be useful to have parallel processing of the cells used to capture digital values. Further, a key factor in the practical application of the digital photocell is that the relatively long integration times of the analog photocell portion allows the use of a relatively slow, but therefore simple method of digitization. For motion video, which involves certain inherently serial operations such per-pixel difference calculations (where the difference between pixels and/or frames rather than the original values are encoded), it is useful to implement an architecture that allows such calculations to be performed on the imaging device rather than strictly through a host processor.

SUMMARY OF THE INVENTION

What is disclosed is an apparatus comprising an analog photocell adapted to capture light energy incident upon it as an analog signal, a sample-and-hold amplifier coupled to the photocell and adapted to store the analog signal and a digital converter coupled to the amplifier, the converter transforming the analog signal into a digital value, the value proportional to the amount of the light energy.

BRIEF DESCRIPTION OF THE DRAWINGS

The objects, features and advantages of the method and apparatus for the present invention will be apparent from the following description in which.

DETAILED DESCRIPTION OF THE INVENTION

Figure 6:
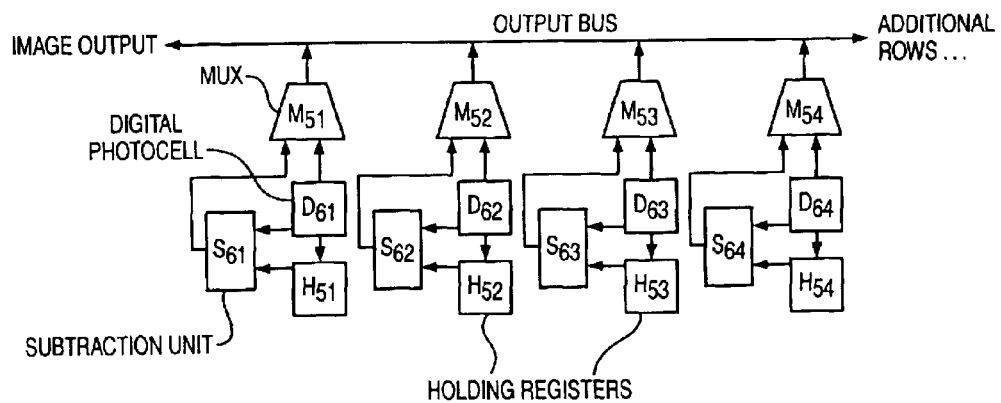
FIG. 6 illustrates a per-pixel digital difference engine according to an embodiment of the invention.

One aspect of the invention involves enhancing each photocell that is used in the imaging array to capture a scene. Rather than using a purely analog photocell it may be advantageous, in devices manufactured from CMOS technology, to utilize a combination of analog and digital signaling. An analog photocell can be embedded, according to one embodiment of the invention, with conversion circuitry to create a digital photocell. The digital photocell will convert the analog signal generated by incident light into a digital code, allowing it to image processed in the digital domain. An array of such digital photocells can be used, as shown in FIG. 6, to implement a digital image processing system on the imaging device.

Figure 1:
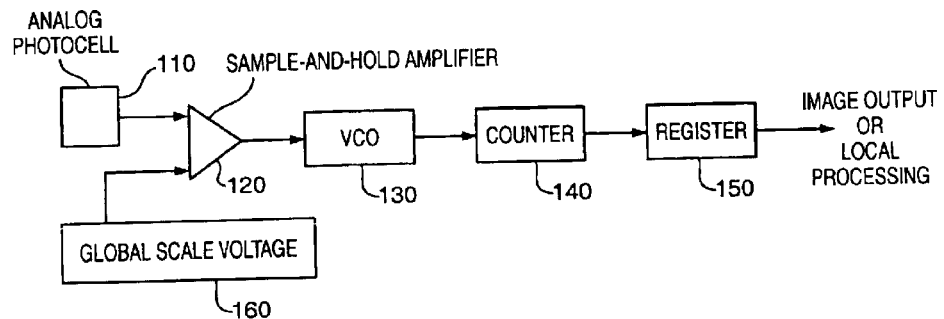
FIG. 1 illustrates a digital photocell utilized in the invention.

FIG. 1 illustrates a digital photocell utilized in the invention.

An analog photocell 110 captures the light energy incident upon it from the scene being imaged. The analog photocell 110 operates according to an integration time, T, which varies according to ambient light condition. The integration time is less than the interval needed to saturate the photocell. The charge accumulated at the photocell is input to a sample and hold amplifier 120. When the photocell discharges its charge, a counter 140 is reset and begins counting for the next integration period. The counter 140 is driven by a voltage control oscillator (VCO) 130. VCO 130 has an input level set by a previously acquired charge that has been stored in the sample and hold amplifier 120. VCO 130 controls the speed at which the counter 140 increases. The greater the light intensity at the analog photocell the faster the counter 140 will be driven by VCO 130. During an integration period for a particular charge, counter 140 is counting up, and before reset, its value is sent to a register 150. The digital value in register 150, which is also the final value of counter 140, reflects the intensity value of the pixel in the previous integration period. For a motion imaging system, register 150 contains the pixel of one "frame" in the imaging. The photoelectric charge representative of the next frame is in sample and hold circuit 120 while the counter 140 is generating the digital value representative of the next frame. The register 150 holds the pixel value until it is output as part of the image or for further processing. Each of the digital photocells that compose the imager pixel array may be regulated using the same timing and control sequence since the photocells act in parallel, outputting an entire frame periodically.

To ensure that the dynamic range of the counter matches the dynamic range of the photocells, the sample and hold amplifier can be equipped to scale the input to VCO 120 as appropriate. The dynamic range may be mismatched due to differing ambient light levels in the scene being captured. The variance in integration period that may result from a charge in ambient light of the scene ensures that the captured image has the proper contrast. To adjust the dynamic range of the VCO 120 to match the analog photocell, a global scaling voltage 160 can be applied to the sample and hold amplifier of each digital photocell in the array which uniformly adapts the VCO component in each photocell to have a dynamic range consistent with the present ambient light conditions. The enhanced digital photocell of FIG. 1 may be utilized in a serial imaging device, or for use in parallel image processing architectures.

Figure 2:
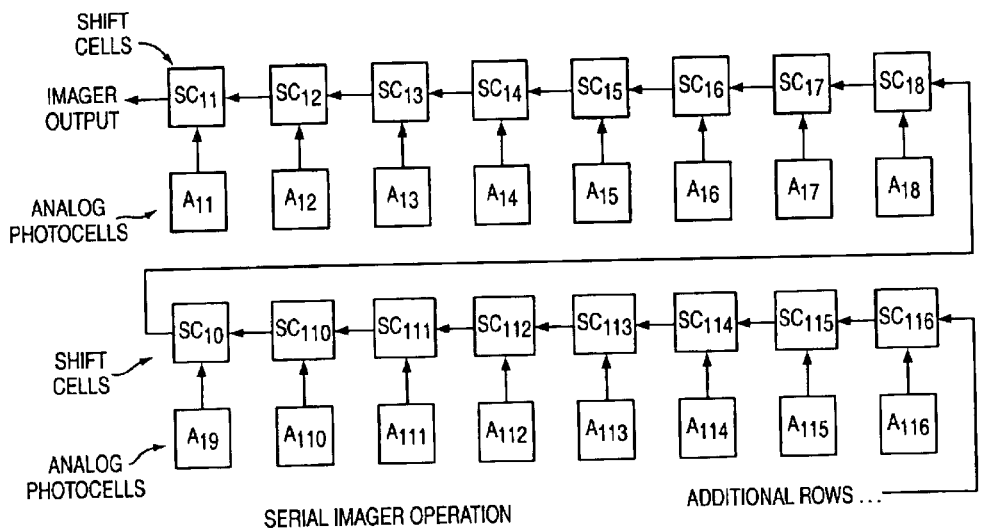
FIG. 2 is a simplified block diagram of a conventional serial imager.

FIG. 2 is a simplified block diagram of a conventional serial imager.

As noted above, motion video compression such as MPEG, utilizes a differencing approach to encode successive frames of image data. After two frames are captured or imaged completely, the difference between corresponding pixels is computed and this difference is then encoded. This allows highly correlated or redundant image features to be encoded using the fewest number of bits. For instance, in a video-conferencing session, the background of the captured image may change only slightly or not at all from one frame instance to the next. In this case, rather than transmitting the entire background portion at a successive frame, just the pixel variance between frames could be transmitted. In FIG. 2, the serial imager utilized in CCD imaging devices would shift out pixel information for an entire frame and then another entire frame before the first difference frame could be computed. This conventional method required thus the capturing and storing of two (or more) entire image frames to generate a third frame representing the difference. The first frame, a "key" frame is captured and digitized, as is a successive frame. The digitized frames are then differed to generate a difference frame. To reduce the delay and computational load in conventional image differencing apparatus, an architecture similar to that of FIG. 3 may be employed.

Figure 3:
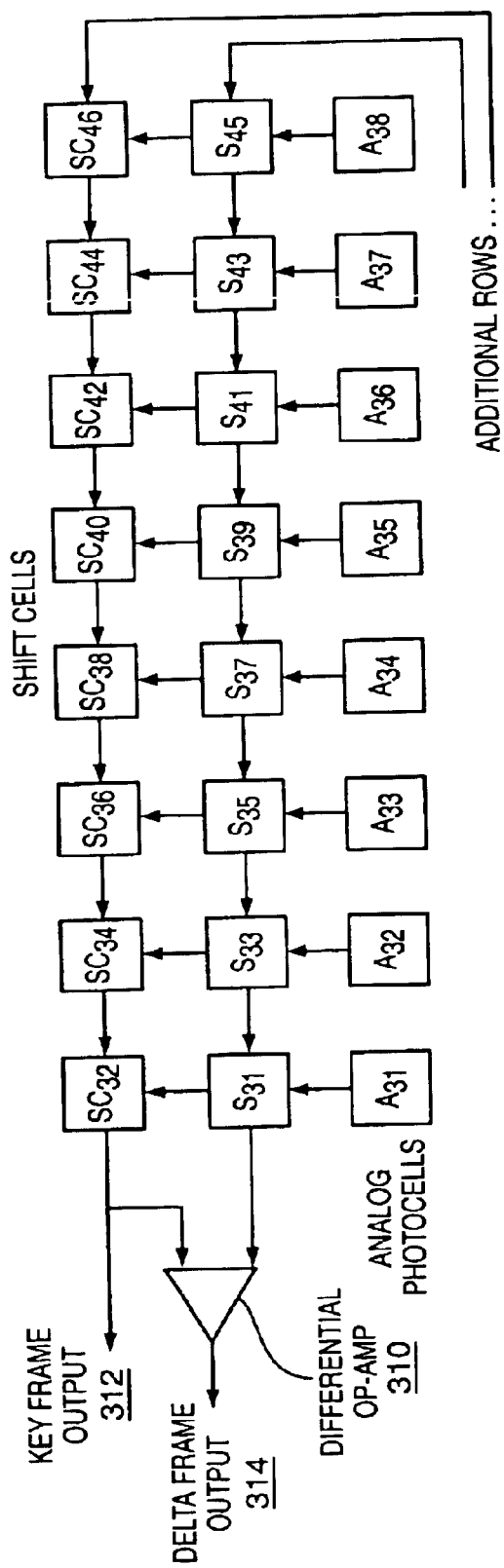
FIG. 3 illustrates an architecture for more efficient image differencing.

FIG. 3 illustrates an architecture for more efficient image differencing. The conventional design of imaging devices is to perform differencing of successive captured frames after they are captured and digitized. To improve upon this conventional design, the computational load can be reduced significantly if an analog differencing is done prior to digitizing. The parallel-shift differencing apparatus of FIG. 3 utilizes shifting to achieve the goal of generating image difference data.

Consider a set of eight exemplary analog photocells $A_{31}$, $A_{32}$, $A_{33}$, $A_{34}$, $A_{35}$, $A_{36}$, $A_{37}$, and $A_{38}$. Photocells capture analog light intensity at fixed locations in the scene. These intensity values are represented by an amount of charge that accumulates in the photocell during its integration time. The photocells $A_{31}$, ... $A_{38}$ do not generate a digitized output as does the digital photocell unit of FIG. 1. Rather, the stored charge is passed at the end of the integration period (which is the same for all photocells in a given frame instant), to a corresponding shift cell. For each row of analog photocells, there are two rows of shift cells. One row of shift cells stores photocell outputs for a first frame ("key" frame) while a second row of shift cells stores the photocell outputs of the successive frame. Each row of shift cells outputs photocell data serially.

The row of shift cells for key frame output are designated $S_{32}$, $S_{34}$, $S_{36}$, $S_{38}$, $S_{40}$, $S_{42}$, $S_{44}$ and $S_{46}$. The row of shift cells storing output for the frame immediately succeeding the key frame are labeled $S_{31}$, $S_{33}$, $S_{35}$, $S_{37}$, $S_{39}$, $S_{41}$, $S_{43}$ and $S_{45}$. When the imaging architecture is first initialized, all shift cells store a null or zero intensity value. When the first image frame is captured, each of the analog photocells $A_{31}$, ... $A_{38}$ will develop a charge representative of light intensity at a particular location in the scene that is incident upon the photocell. This set of signals is transferred to the row of shift cells $S_{31}$, $S_{33}$, ... $S_{46}$. The row of shift cells for key frame is at that instant, unfilled. Rather than outputs this first frame of data, the architecture waits until the next frame is captured. When the next image frame is captured by analog photocells $A_{31}$, ... $A_{38}$, the result of the previous frame is first transferred from shift cells $S_{31}$, $S_{33}$, ... $S_{45}$ to the row of shift cells $S_{32}$, $S_{34}$, ... $S_{46}$, respectively, as indicated in FIG. 3. Next, at the end of the integration period for the second frame, the signals are transferred from analog photocells $A_{31}$, ... $A_{38}$ to the shift cells $S_{31}$, $S_{33}$, ... $S_{45}$. At that instant, both rows of shift cells contain image frame information. The row of shift cells $S_{32}$, $S_{34}$ ... $S_{46}$ which stores the first frame is shifted out. This represents a key frame output 312. Key frame output 312 is simultaneously shifted to an input differential op-amp (operational amplifier) 310.

The result of the current frame stored in shift cells $S_{31}$, $S_{33}$, ... $S_{45}$, is shifted out to the other input of differential op-amp 310. Differential op-amp 310 generates an analog signal, delta frame output 314, which is the result of previous frame (key frame) subtracted from the current frame. The analog signal delta frame output 314 and key frame output 312 may both be digitized prior to storage or processing. Since a serial shifting operation will output the analog key frame and current frame outputs only pixel by pixel, the entire current frame and key frame must first be shifted to output and to differential op-amp 310. After the serial shifting operation is complete and the last of the key and current frames are output/processed, then the current frame stored in shift cells $S_{31}$, $S_{33}$, ... $S_{45}$ is shifted in parallel to the row $S_{32}$, $S_{34}$, ... $S_{46}$ and thus, becomes the next key frame.

The advantages of this design lie primarily in the ability to send to digitization only an analog difference frame output, rather than two entire image frames. Depending on the further down-the-line processing to be performed, the delta frame output 314 and/or the key frame output 312 may be digitized. In the conventional design, two entire frames of analog photocell information is captured, and shifted out separately, after which digitizing and differencing are performed. In the architecture of FIG. 3, both the key frame 312 and the differential for the next frame (delta frame output 314) are shifted to output simultaneously.

The embodiment of FIG. 3 still requires the shifting out of an entire key frame and difference frame, albeit simultaneously, before another frame can be captured by the analog photocell. A further improvement to this architecture is shown in FIG. 4 according to yet another embodiment of the invention.

Figure 4:
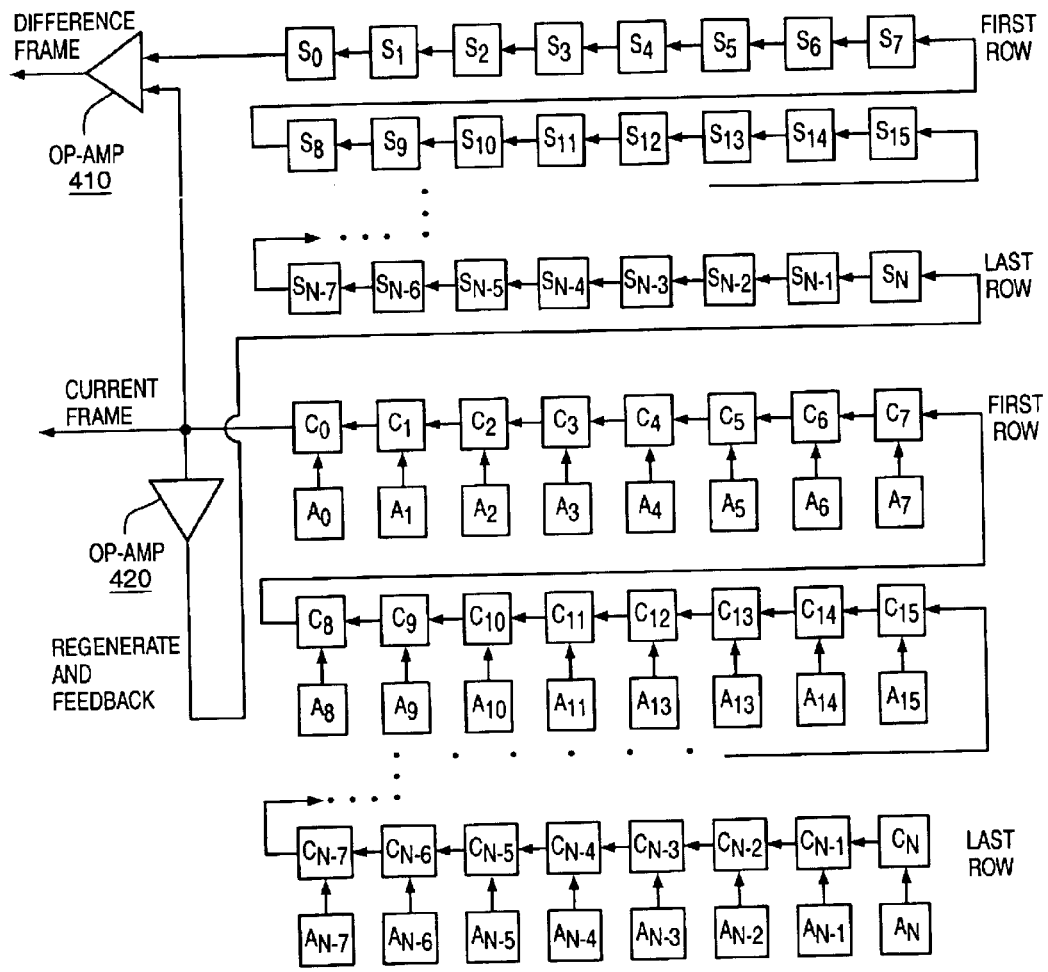
FIG. 4 illustrates one embodiment of the invention.

FIG. 4 illustrates one embodiment of the invention.

In the embodiment of FIG. 4, the current frame is shifted out immediately and is also regenerated and fed back by way of an op-amp 420.

In the architecture of FIG. 4, a current image frame is captured by an array of N+1 analog photocells $A_0, A_1 \ldots A_N$ which are then passed in parallel to shift cells $C_0, C_1 \ldots C_N$, respectively. Shift cells $C_0, C_1 \ldots C_N$ shift out the captured frame data in a cascade (bucket-brigade) fashion from $C_N$ to $C_0$. The current frame data is regenerated by an op-amp 420 and fed back to an array of shift cells $S_N \ldots S_0$ as shown. As the regenerated current frame is fed back, the current frame is differenced against a previous frame shifted out of the array of shift cells $S_0 \ldots S_N$. The differencing between the current frame and the previous frame is accomplished by an op-amp 410 and produces a pixel-by-pixel difference frame output. This serial imaging system has the intended advantage of providing both the current frame and a difference frame without having to wait for an entire frame of pixel data to be captured. Ordinarily, two frames, a first frame and a second frame must both be captured before a difference frame can be generated. The architecture of FIG. 4 eliminates such a limitation on serial imaging. Op-amps 410 and 420, though not described in detail, can be designed by one of skill in the art but should have the capabilities of boosting signal integrity in the case of op-amp 420 and differencing two signals in the case of op-amp 410.

Figure 5:
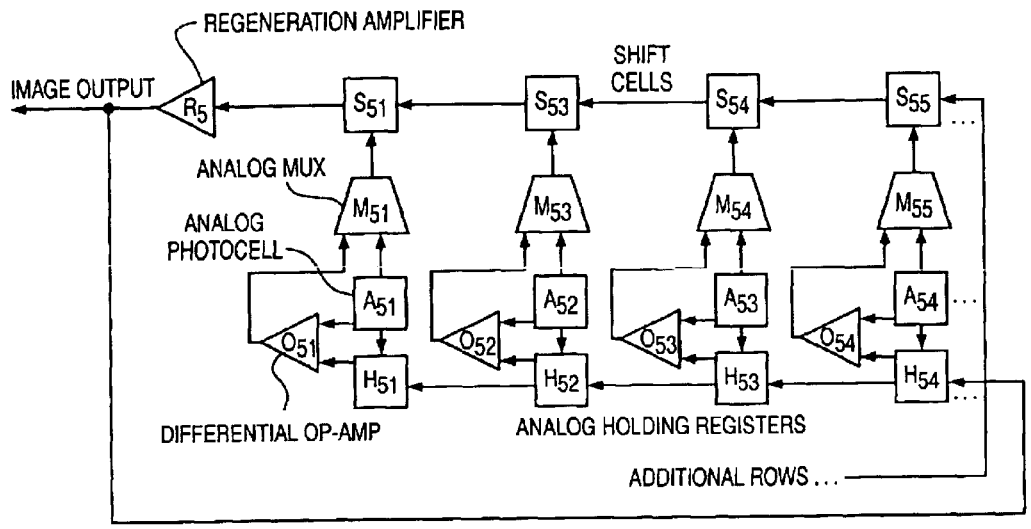
FIG. 5 illustrates a per-pixel analog difference engine according to an embodiment of the invention.

FIG. 5 illustrates a per-pixel analog difference engine according to an embodiment of the invention.

The embodiment of FIG. 5 allows the transmission of multiple difference frames based upon a key frame. The imaging apparatus would first capture and transmit at the image output the key frame where none of the pixels are differential. This key frame, shifted out via shift cells $S_{51}$, $S_{52}, \ldots S_{54}$, is also fed back into an array of analog holding registers $H_{51}, H_{52}, \ldots H_{54}$. Prior to being fed back and output, each pixel is passed to a regeneration amplifier R5 which regenerates the charge level of the pixel to avoid loss in the delay of transmission. This feedback of the current frame into holding registers $H_{51} \ldots H_{54}$ assures that the frame will be available as the "previous" frame when the next frame is captured. With the completed frame thus stored, it is possible to calculate a difference frame and transmit this difference at the next frame cycle.

To achieve this, the output each analog holding register $H_{51}, H_{52}, H_{53}$ and $H_{54}$ is linked to the input of a differential operational amplifier $O_{51}, O_{52}, O_{53}$ and $O_{54}$, respectively. The current frame is captured by analog photocells $A_{51}, A_{52}$, $A_{53}$ and $A_{54}$ whose output is passed to other input of differential operational amplifier $O_{51}, O_{52}, O_{53}$ and $O_{54}$, respectively. After the key frame is transmitted, at the output, each subsequent frame may be transmitted as the difference relative to the previous frame or key frame as computed by amplifiers $O_{51}, O_{52}, O_{53}$ and $O_{54}$. Any number of subsequent "difference" frames may be transmitted to the output until the next key frame is desired. The input to each shift cell $S_{51}, S_{52}, S_{53}$ and $S_{54}$ is one of either the entire original frame captured by analog cells $A_{51}, A_{52}, A_{53}$ and $A_{54}$, respectively, (when a key frame is desired) or the difference output of the operational amplifiers $O_{51}, O_{52}, O_{53}$ and $O_{54}$, respectively.

A select signal (not shown) is sent to each of a set of analog multiplexers $M_{51}, M_{52}, M_{53}$ and $M_{54}$ which routes either the appropriate key frame data (frame $A_{51}, A_{52}, A_{53}$ and $A_{54}$, respectively) or difference frame data ($O_{51}, O_{52}, O_{53}$ and $O_{54}$) as desired by the application user to shift cells $S_{51}, S_{52}, S_{53}$ and $S_{54}$, respectively. Additional rows of shift cells and similar architecture may be linked together one after another as described.

FIG. 6 illustrates a per-pixel digital difference engine according to an embodiment of the invention.

The embodiment of FIG. 6 allows the transmission of multiple difference frames based upon a key frame. The imaging apparatus would first capture and transmit at the image output the key frame where none of the pixels are differential. The initial key frame which is captured by digital photocells (pixels) D61, D62, D63 and D64, is output on output bus 600. Simultaneously, the digital pixels D61, D62, D63 and D64 is fed to a series of digital holding registers H61, H62, H63 and H64, respectively. This feedback of the current frame into holding registers $H_{61} \ldots H_{64}$ assures that the frame will be available as the "previous" frame when the next frame is captured. With the completed frame thus stored, it is possible to calculate a difference frame and transmit this difference at the next frame cycle.

To achieve this, the output each digital holding register $H_{61}, H_{62}, H_{63}$ and $H_{64}$ is linked to the input of a subtraction unit $S_{61}, S_{62}, S_{63}$ and $S_{64}$, respectively. The current frame is captured by digital photocells $D_{61}, D_{62}, D_{63}$ and $D_{64}$ whose output is passed to other input of subtraction unit $S_{61}, S_{62}$, $S_{63}$ and $S_{64}$, respectively. After the key frame is transmitted, at the output, each subsequent frame may be transmitted as the difference relative to the previous frame as computed by subtraction units $S_{61}, S_{62}, S_{63}$ and $S_{64}$. Any number of subsequent "difference" frames may be transmitted to the output until the next key frame is desired.

The output bus transmits one of either the key frame pixels (from $D_{61}, D_{62}, D_{63}$ and $D_{64}$) or difference frame pixels (from subtraction units $S_{61}, S_{62}, S_{63}$ and $S_{64}$) depending on what the applicant/user desires. Based upon the desired mode, key or difference, a select signal (not shown) is sent to each one of digital multiplexers $M_{61}, M_{62}, M_{63}$ and $M_{64}$ which then accordingly routes either key frame pixels (from $D_{61}, D_{62}, D_{63}$ and $D_{64}$, respectively) or difference frame pixels (from $S_{61}, S_{62}, S_{63}$ and $S_{64}$, respectively) as indicated. Additional digital outputs similar to those provided by $M_{61}, M_{62}, M_{63}$ and $M_{64}$ may be repeatedly constructed for each pixel desired.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. A system comprising:
    an array of analog photocells;
    a first plurality of shift cells, an output of each shift cell in the first plurality of shift cells being coupled to an input of the next shift cell in the first plurality of shift cells, each of the photocells in the array of analog photocells being coupled to a corresponding shift cell in the of the first plurality of shift cells;
    a second plurality of shift cells, an output of each shift cell in the second plurality of shift cells being coupled to an input of the next shift cell in the second plurality of shift cells, a signal from a terminating output of the first plurality of shift cells being transferred to an input of a first shift cell in the second plurality of shift cells;

a regeneration amplifier having an input coupled to the terminating output of the first plurality of shift cells and having an output coupled to the input of the first shift cell of the second plurality of shift cells; and a differential operational amplifier having at least two inputs, a first input of the differential operational amplifier being coupled to the terminating output of the first plurality of shift cells and a second input being coupled to a terminating output of the second plurality of shift cells.

2. The system of claim 1, wherein the regeneration amplifier enhances the output signal of the first plurality of shift cells.

3. The system of claim 2, wherein signals obtained from the terminating output of the second plurality of shift cells represent a key frame of an image captured by the array of analog photocells.

4. The system of claim 3, wherein the differential operational amplifier produces signals that are representative of the difference between signals obtained from the terminating output of the first plurality of shift cells and signal obtained from the terminating output of the second plurality of shift cells.

5. The system of claim 4, wherein the signals produced by the differential operational amplifier represent a delta frame for an image captured by the array of analog photocells.

6. A method comprising:

transferring a signal from each photocell in an array of analog photocells to a corresponding storage location in a first plurality of storage locations, an output of each storage location in the first plurality of storage locations being coupled to an input of the next storage location in the first plurality of storage locations;

amplifying signals from a terminating output of the first plurality of storage locations;

transferring the amplified signals from the terminating output of the first plurality of storage locations to an input of a first storage location in a second plurality of storage locations, an output of each storage location in the second plurality of storage locations being coupled to an input of the next storage location in the second plurality of storage locations; and determining the difference between signals from the terminating output of the first plurality of storage locations and signals from a terminating output of the second plurality of storage locations.

7. The method of claim 6, wherein signals obtained from the terminating output of the first plurality of storage locations represent a key frame of an image captured by the array of analog photocells.

8. The method of claim 7, wherein determining the difference between signals from the terminating output of the first plurality of storage locations and signals from the terminating output of the second plurality of storage locations produces a delta frame for an image captured by the array of analog photocells.

* * * * *